United States Patent [19]
Heater

[11] 3,762,058

[45] Oct. 2, 1973

[54] GRADE SETTING AND SURVEYOR ROD

[76] Inventor: Paul Edward Heater, Santa Rosa, Calif.

[22] Filed: June 14, 1971

[21] Appl. No.: 152,747

Related U.S. Application Data

[63] Continuation-in-part of Ser. No. 870,211, March 30, 1970, abandoned.

[52] U.S. Cl.................... 33/161, 33/295, 33/342, 287/58 CT
[51] Int. Cl. .............................................. G01b 3/08
[58] Field of Search ................. 33/161; 287/58 CT, 287/DIG. 85

[56] References Cited
UNITED STATES PATENTS
| | | | |
|---|---|---|---|
| 149,532 | 4/1874 | Sherwin | 33/161 |
| 2,583,205 | 1/1952 | Boisen | 33/161 |

FOREIGN PATENTS OR APPLICATIONS
| | | | |
|---|---|---|---|
| 635,526 | 1/1962 | Canada | 287/58 CT |
| 230,314 | 6/1944 | Switzerland | 287/58 CT |
| 495,985 | 11/1938 | Great Britain | 33/161 |

*Primary Examiner*—William D. Martin, Jr.
*Attorney*—George B. White

[57] ABSTRACT

A rod or measuring instrument which has a plurality of telescoping tubes having measuring scales on the periphery of said tubes, means for locking said telescoping tubes at any random length, said locking means including a cut away portion at the inner end of each inside tube of said telescoping tubes and an inclined substantially crescent shaped channel formed in said cut away portion of said tube, and a ball or a roller fitted within said channel which ball or roller is free to roll towards a narrow end of said channel when the tubes are turned, thereby wedging said tubes together; and plugs mounted in the ends of the outer tubes.

4 Claims, 8 Drawing Figures

PATENTED OCT 2 1973 3,762,058

PAUL E. HEATER
INVENTOR

INVENTOR
Paul Heater

GRADE SETTING AND SURVEYOR ROD

BACKGROUND OF THE INVENTION

This invention pertains to a measuring instrument that would be of particular use to field engineers, surveyors, and other trades needing a long, rigid measuring device.

All the currently available equipment along these lines are heavy, cumbersome and expensive. Because of that fact, many field engineers make their own measuring instruments.

It is often desirable to have an instrument of great length but they are unwieldy and awkward much of the time when this great length is not used. An extendable measuring instrument which is light yet strong would be of great convenience, but one whose overall length could be extended in a variable manner and locked into position quickly would be even better.

Having an instrument capable of achieving a great length would in many cases eliminate the need for using a tape measure and so make for rapid measurements.

Because there is an unfilled need for such a versatile measuring instrument, there will be a ready market.

It is an object of this invention to provide a needed telescoping rod such as a measuring instrument, which is light, rigid, durable, and economical and which can be quickly locked at any selected overall length by a simple turn of the telescopic part.

A still further object is to incorporate a level bubble in the measuring instrument to provide a long and extendable level in the same unit.

DETAILED DESCRIPTION

Figure 3:
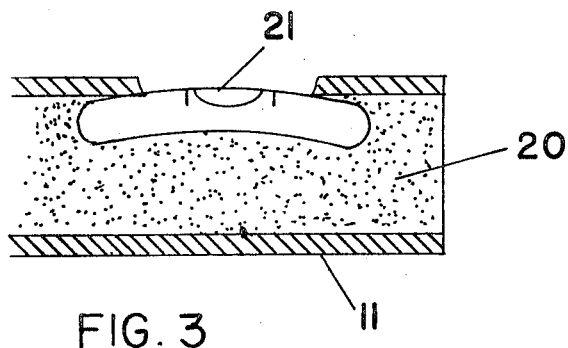
FIG. 3 is a cross-section of the uppermost end of the interior tube, showing the level bubble placement and sealed end of the tube.
Figure 1:
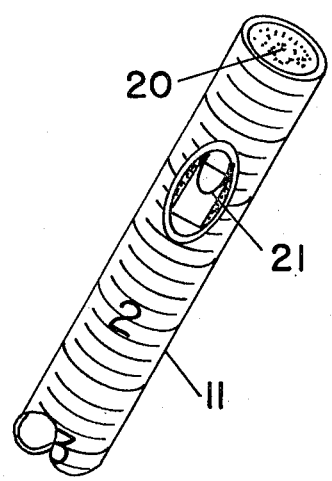
FIG. 1 is an isometric view of a complete grade setting rod fully extended and broken at the midpoint of the interior and exterior tubes.
Figure 1:
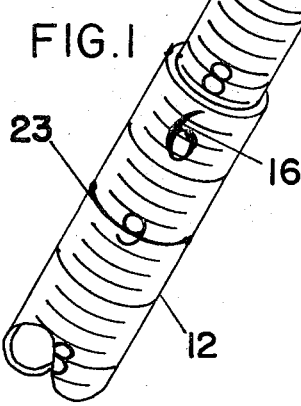

While numerous tubular measuring devices can be made using the principles of this invention, the illustrative embodiment herein is in the form of a grade setting rod, wherein a ⅝ inch tube 11 is fitted inside a ¾ inch tube 12. In this embodiment anodized aluminum tubes 6 feet in length were used.

On opposite sides of the tubes 11 and 12 are printed engineers' scales calibrated in hundredths 14 and tenths 15 of a foot. The foot numerals 16 are printed in larger sizes and a contrasting color.

These markings and printed scales could in a similar fashion be inches, centimeters, or any specialized form of linear measurement.

The outer tube 12 is graduated up to 6 feet. The inner tube 11 continues in the same manner up to eleven and eight tenths feet when it is fully extended. The inner tube 11, by use of an interior locking device, hereinafter described, may be locked into any position along its length.

Figure 4:
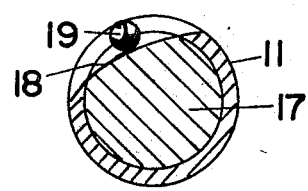
FIG. 4 is a sectional end view of the internal locking mechanism.
Figure 2:
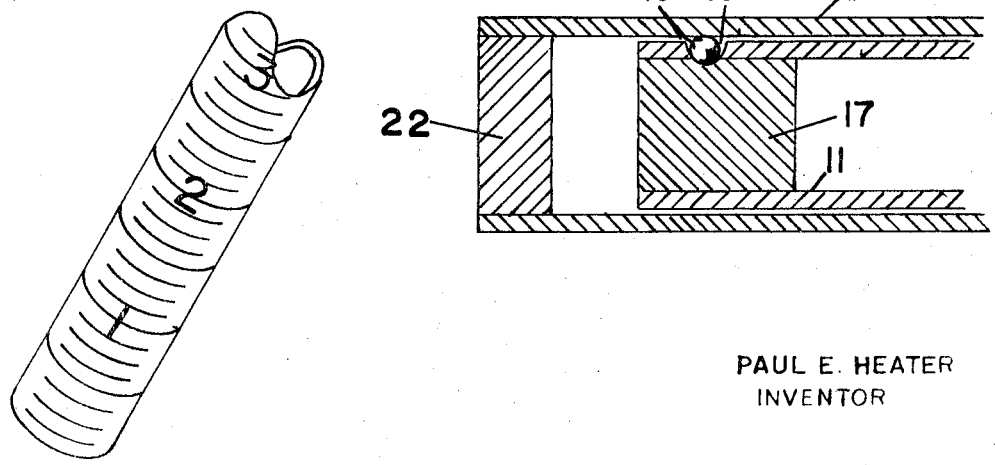
FIG. 2 is a cross-section drawing of the interior and exterior tubes, illustrating the locking mechanism and the sealed end of the tubes.

The locking mechanism shown in FIGS. 1 to 4 inclusive, is made by inserting a metal plug 17 into the inner tube 11 then inletting a groove through the tube 11 and the plug 17 to create a tapering, curving channel 18 along the base of the inner tube 11 and placing a bearing ball 19 of appropriate size in the channel, as in FIG. 4. The inner tube 11 is fitted into the exterior tube 12, the inner tube 11 when rotated will move the ball 19 along the channel 18 until it reaches the shallow end of the groove whereupon it wedges against the wall of the outer tube 12 and is pressed into the inner tube 11, thereby locking tubes together at that length. The tubes can be quickly and easily released from position by rotating the tubes in the opposite direction.

The base of the outer tube 12 is closed with a metal plug 22. All metal plugs are press fit and cemented in.

In order to prevent the inner tube 11 from being free to escape, the outer tube 12 is necked down near the pen end portion 23. Different diameters of tubes could be used and the number of extensions increased using the principles of this invention.

In order to adapt this measuring rod to the needs of the trade a bubble level 21 is placed in the upper end of the inner tube 11 using a durable quick setting compound 20 to hold the level and seal the end of the tube 11.

Figure 5:
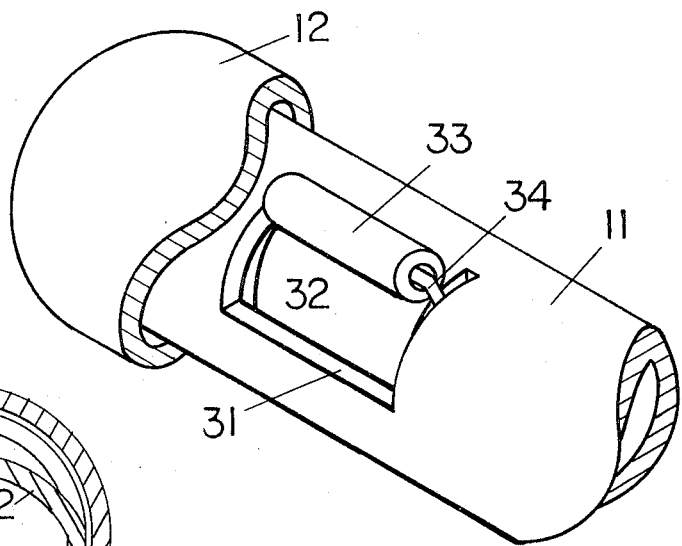
FIG. 5 is a fragmental isometric view of the telescoping portion of the rods showing a roller held in a wedging channel.
Figure 6:
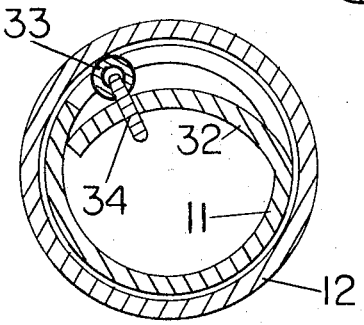
FIG. 6 is a cross-sectional view taken through the roller and the channel.

In the form shown in FIGS. 5 and 6, the cut away portion 31 is cut on three sides only and the tongue 32 is bent about its uncut edge inwardly of the tube 11 to form the wedging channel. A tubular roller 33 has a wire loop 34 extended therethrough which is placed over the tongue 32 from its free end inwardly to hold the roller 33 in place. As the inner tube 11 is rotated in clockwise direction, viewing FIG. 5, the roller roles to the wider portion of the channel and releases the inner tube 11. When the inner tube 11 is turned in contra-clockwise direction, or when the outer tube 12 is turned in a clockwise direction viewing FIG. 5, the roller 33 is rolled to the shallow end of the channel guide and is wedged tightly between the tubes to hold them in adjusted position.

Figure 7:
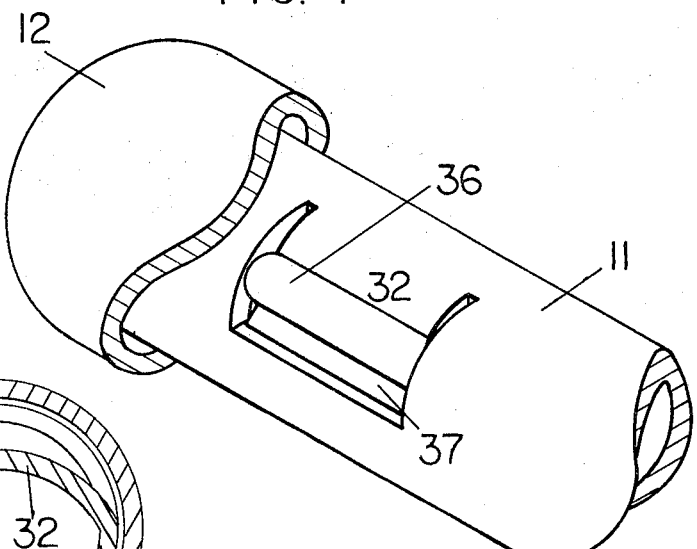
FIG. 7 is an isometric view of the magnetically held roller in the wedging channel of the telescoping member.
Figure 8:
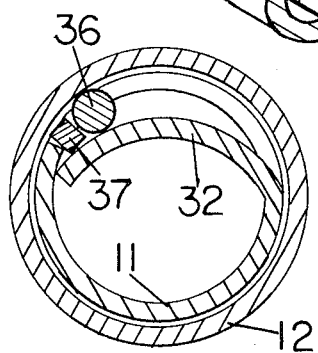
FIG. 8 is a cross-sectional view through the magnetically held roller in the wedging channel.

The form shown in FIGS. 7 and 8 operates in the same manner as the embodiment described in FIGS. 5 and 6 except that the wire loop 34 is omitted and the roller 36 is held in the widest portion of the channel by a permanent magnet 37.

The use of graduated size tubes in combination with the herein wedging locking mechanisms, together with imprinted and durable linear graduations, constitutes the basic fundamentals of this invention and results in a clearly new and novel measuring device, together with the feature that the rolling element, namely the ball or roller, is completely contained in the deeper portion of the guide channel in the releasing position and is gradually lifted from said guide channel into wedging contact with the inner periphery of the outer tube by the relative turning of the tubes into locked position.

I claim:
1. A telescoping instrument comprising,
a plurality of telescoping tubes, including at least one outside tube and one inside tube,
means for locking said telescoping tubes at any selected random length,
an inwardly inclined guide adjacent the inner end of the inner tube formed by a cut away portion of the wall of the inside tube cut on three sides thereof and bent inwardly of said inside tube,
the opposite cut away side edges and said guide forming a guide channel,
a rolling element within said channel and on said inclined guide being free to roll on said inclined guide in said channel radially outwardly of said inner tube when the tubes are turned in one direction thereby wedging said tubes together, and to roll from said narrow peripheral end inwardly to the deepest portion of said channel when the tubes are turned in the opposite direction thereby to free said tubes for telescopic adjustment,
said rolling element being completely withdrawable into said deepest portion of said channel within the periphery of said inside tube.

2. The telescoping instrument specified in claim 1, and
said rolling element being a roller freely rolling on said guide surface.

3. The telescoping instrument specified in claim 2, and
said roller being tubular and a loop extended through said roller and around said inwardly bent guide for rotatably holding said roller in said channel.

4. The telescoping instrument specified in claim 2, and
a permanent magnet at said deepest portion of said channel for attaching said roller at said deepest portion.

* * * * *